(12) United States Patent
Zhang (10) Patent No.: US 9,345,349 B1
(45) Date of Patent: May 24, 2016

(54) SUPPORT STAND ASSEMBLY (71) Applicant: Ning Zhang, Frisco, TX (US)

(72) Inventor: Ning Zhang, Frisco, TX (US)

( * ) Notice: Subject to any disclaimer, the term of this patent is extended or adjusted under 35 U.S.C. 154(b) by 37 days.

(21) Appl. No.: 14/855,182

(22) Filed: Sep. 15, 2015

(51) Int. Cl.
| | |
|---|---|
| *A47G 19/02* | (2006.01) |
| *H01F 7/02* | (2006.01) |
| *H01F 7/08* | (2006.01) |
| *H01H 13/14* | (2006.01) |
| *H02K 11/00* | (2016.01) |
| *H02K 1/12* | (2006.01) |

(52) U.S. Cl.
CPC ............... *A47G 19/025* (2013.01); *H01F 7/02* (2013.01); *H01F 7/08* (2013.01); *H01H 13/14* (2013.01); *H02K 1/12* (2013.01); *H02K 11/0094* (2013.01)

(58) Field of Classification Search
CPC ..... A47G 19/025; A63H 13/20; A63H 33/26; H01F 7/06
See application file for complete search history.

(56) References Cited

U.S. PATENT DOCUMENTS

| | | | | |
|---|---|---|---|---|
| 1,322,456 | A * | 11/1919 | King | A63H 13/20 446/246 |
| 3,368,693 | A * | 2/1968 | Bochory | F21V 21/096 108/26 |
| 5,743,780 | A * | 4/1998 | Liu | A63H 13/20 40/406 |
| 2009/0270184 | A1* | 10/2009 | Kumagai | A63F 9/143 463/61 |
| 2013/0157208 | A1* | 6/2013 | Kazadi | F21V 35/00 431/289 |

* cited by examiner

*Primary Examiner* — Gary Hoge
(74) *Attorney, Agent, or Firm* — Timothy T. Wang; Ni, Wang & Massand, PLLC (57) ABSTRACT

A support stand assembly having a portable table stand suitable for placing one or more holders for candles, figurine or other decorative items on its top surface. There are one or more candleholders with a permanent magnet located at the bottom of each holder. A plurality of electromagnets is fixed inside the table stand underneath the top surface. Underneath the top surface of the cake stand is one or more integrated circuit boards with circuitry for controlling the switch of magnetic poles of said electromagnets in a group and causing regulated stepping movement of the candleholders by utilizing the magnetic force between magnets in candleholders and the ones inside the table stand. It provides an all-hardware solution that does not require software programming and is easy and economical to manufacture.

19 Claims, 11 Drawing Sheets

FIG. 5B
TRIANGULAR ARRANGEMENT OF STATOR

FIG. 5A
LINEAR ARRANGEMENT OF STATOR

FIG. 11A LOGIC DIAGRAM

FIG. 11B TIMING DIAGRAM

CMOS 7555 TIMER

US 9,345,349 B1

SUPPORT STAND ASSEMBLY

BACKGROUND OF THE INVENTION

Field of the Invention

The inventions disclosed herein are generally related to a support stand for baked goods, home or office decorations, or small toys in general and to assemblies including a support stand and holders for candles, figurines, or toys. More specifically, it is related to a support stand with holders capable of making stepping movements.

A birthday celebration, especially the ones for young kids is an important family occasion. The birthday cake, in addition to serving as a conclusion to the birthday party, stands as a prominent symbol of the event, usually in full view of the participants, throughout the time prior to and during the consumption of the birthday lunch or dinner.

There are various cake supports and cake stands one can purchase at a supermarket or specialty store. These cake stands may be formed of metal or plastic and they may add some decorations to make the cake stand more attractive. However, most if not all cake stands only include static decorations or additional lightings.

The importance of a birthday cake calls for a new type of support stand that can add fun to the birthday party or other special occasions with a cake. A support stand should not only be capable of holding candles or figurines, it will be a lot of fun if one can make them move during the time of presenting the birthday cake.

Therefore what is needed is a cake stand with candleholders that can automatically move the candles.

Similarly, such a support stand can be reshaped and customized for holding candles without a cake. The same mechanism can also be applied to a support stand for holding small home or office decorations such as figurines.

SUMMARY

One objective of the support stand assembly is to provide a cake stand having a portable table stand suitable for placing a cake on its top surface. There are one or more candleholders with a permanent magnet located at the bottom of each holder. There is a plurality of electromagnets inside the table stand. The electromagnets are divided into a preset number of groups with a predetermined number of electromagnets in each group, and each group of electromagnets are fixed to preset locations of said table stand. Underneath the top surface of the cake stand are one or more integrated circuit boards with circuitry fur controlling the switch of magnetic poles of said electromagnets in each group and causing regulated stepping movement of the candleholders by utilizing the magnetic force between magnets in candleholders and the ones inside the table stand. A button switch is set on the surface of table stand to start or stop movements of said candleholders.

An objective of the present inventions is to further include a button on top of the cake stand that resets the locations of said candleholders to their preset locations.

The examples presented herein generally include a portable table stand made of non-magnetic material and further includes an outer shell and a base support. The electromagnet used in the examples is generally an electromagnetic stator comprised of a stator core and a stator coil. In one exemplary assembly, the electromagnets are divided into five groups and each group includes three stators. There is one integrated circuit board for each group of three electromagnetic stators. The three electromagnetic stators in each group are aligned linearly on top of each integrated circuit board.

The portable table stand can be in many forms and the most common is round-shaped and each group of stators is evenly aligned along the circle close to the outer rim of said table stand.

Instead of a cake stand, another objective of the present inventions to provide a support stand for holding small home or office decorations such as figurines using the same mechanism to make similar stepping movements.

Another objective of the present inventions is provide an all hardware-based solution that does not require additional software programming and is easy to manufacture. In a typical setting, the circuitry for the assembly includes a clock pulse generator, a sequence pulse generator, and a magnetism regulator. With the proper wiring and settings on the various chips, the integrated circuitry is capable of making stepping movements of the holders by periodically switching the magnetic poles of each electromagnet.

DETAILED DESCRIPTION

Figure 1:
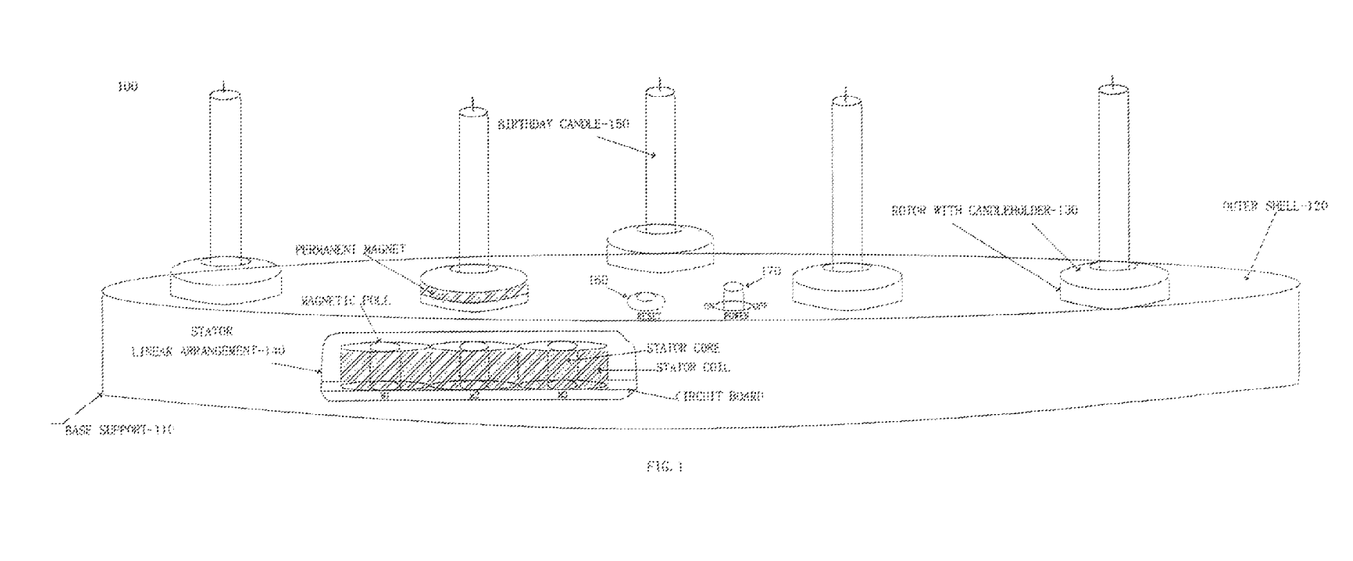
FIG. 1 depicts an overall structural diagram of a preferred embodiment of a cake stand and candleholders assembly.

FIG. 1 shows the overall structural diagram of a preferred example assembly 100. It includes a table stand with a base support 110 and an outer shell 120, both of which are made of non-magnetic materials. The table stand is round-shaped and capable of holding a birthday cake or other bakery products. There are 5 candleholders 130 on the top surface of the outer shell 120. Each candleholder 130 has a permanent magnet fixed in its base portion. The base of the candleholder 130 is made with smooth bottom surface so that the candleholder is capable of moving as a rotor under external forces. Underneath each candleholder 130, there is a combination of 3 magnetic stators and a control circuit board 140. The stator group and circuit board are located inside the table stand. In this example, the stators are lined up in a linear arrangement There are three electromagnetic stators M1, M2, and M3 in each group in this embodiment. Each stator is an electromagnet with stator core and stator coil. Preferably, each electromagnetic stator is comprised of stator coil, iron core, lead wire, and a plug. The stator coil is typically made of 0.2 mm (diameter) enameled wire winding. To make a coil with a size of 20 mm (diameter)×10 mm (height)×6.3 mm (center aperture), it needs about 700 turns of wire. The DC resistance of such a stator is approximately 16 ohm and the inductance from the coil is about 0.23 millihenry. The stator core can be an iron screw with a size of 6 mm (diameter)×16 mm (length). The iron core is inserted into the center hole of the stator coil and fixed to the control circuit board 140 using a 6 mm nut. The iron is magnetized once the current flows through the stator coil. The lead wire from the stator coil can be a two-color plastic wrapping wire. In this example, the lead wire is 60 mm in length and attached to 2.54 mm wide 2-pin plug. The 2-pin plug can be inserted into a matching 2-hole jack in the control circuit board.

The mechanism driving the stepping movements of the candleholders is an all-hardware solution based on sequential logic circuitry. Periodic pulses are generated by the control circuitry, transformed through diode decoders, then outputted through drivers that enables and controls the current direction in the stator coil. The regulated magnetic pole switching makes the candleholder's stepping motion possible by utilizing the attractive and repulsive forces between the stators and the permanent magnet in the bottom of the candleholder.

The bottom of a candleholder is typically the N-pole of the permanent magnet inside. A repulsive force occurs when the top of the electromagnetic stator is also an N-pole. Vice versa, an attractive force occurs when the top of the stator is switched to an S-pole. Stators are fixed to the circuit board inside the support stand while the candleholder is free to move under the magnetic forces.

To regulate the stepping motion of the candleholders, the output from the two drivers to any two adjacent stators is synchronized. In each stepping pulse cycle, two adjacent stators are selected, the magnetic poles at the top of the two stators are the opposite. For example, if one stator is set to an N-pole on the top, then the immediately adjacent stator is set to an S-Pole. An N-pole holder is attracted to the stator with an S-pole but repulsed from the other stator with an N-pole. The combined force will carry the N-pole holder from the corresponding platform location of the N-pole stator to the corresponding platform location of the S-pole stator, completing a regulated linear motion. In the present example, the trace of regulated stepping motion could be as follows:
   a. Two steps forward from stators M1 to M2, and M2 to M3;
   b. Two steps backward from stators M3 to M2, and M2 to M1.
   c. A complete stepping movement of a holder can be completed in four pulse cycles.

Figure 2:
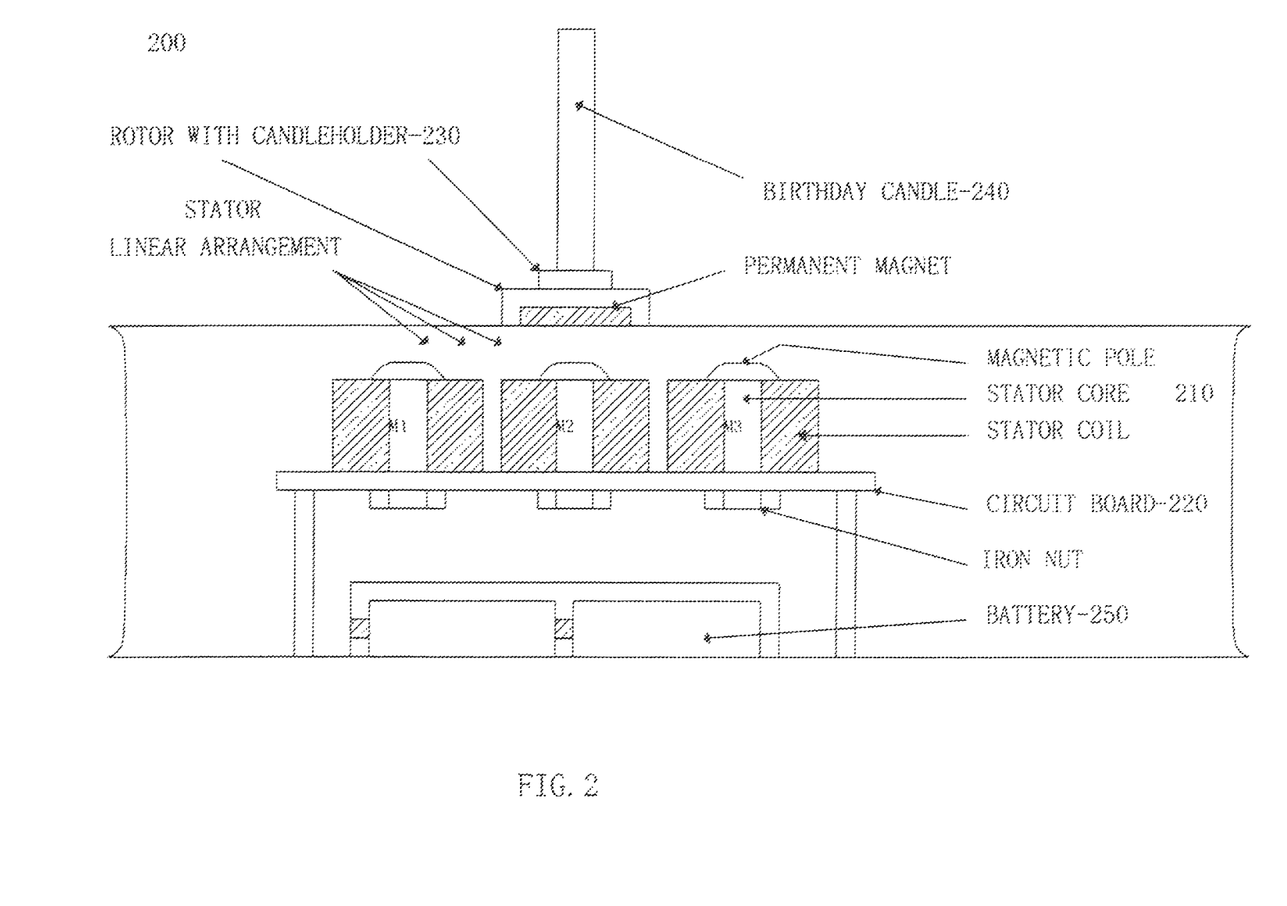
FIG. 2 depicts an overall structural diagram of another preferred embodiment of a support stand and candleholders assembly with one group of electromagnets.

FIG. 2 shows the overall structural diagram of another preferred embodiment of a support stand and candleholder assembly 200. It includes a printed circuit board 220 sitting on top of a support base. Beneath the circuit board 220 is the slot for batteries 250 powering the circuit board. A single group of three stators 210 (i.e., M1, M2, and M3) in a linear arrangement are plugged into the circuit board. As described earlier, each stator coil is connected to a drive in the circuit board for switching the poles of the electromagnets in the stators. The present setting supports one rotor candleholder 230. There is a permanent magnet at the bottom portion of the candleholder 230 with a birthday or scented candle 240 on top of the candleholder.

Figure 3:
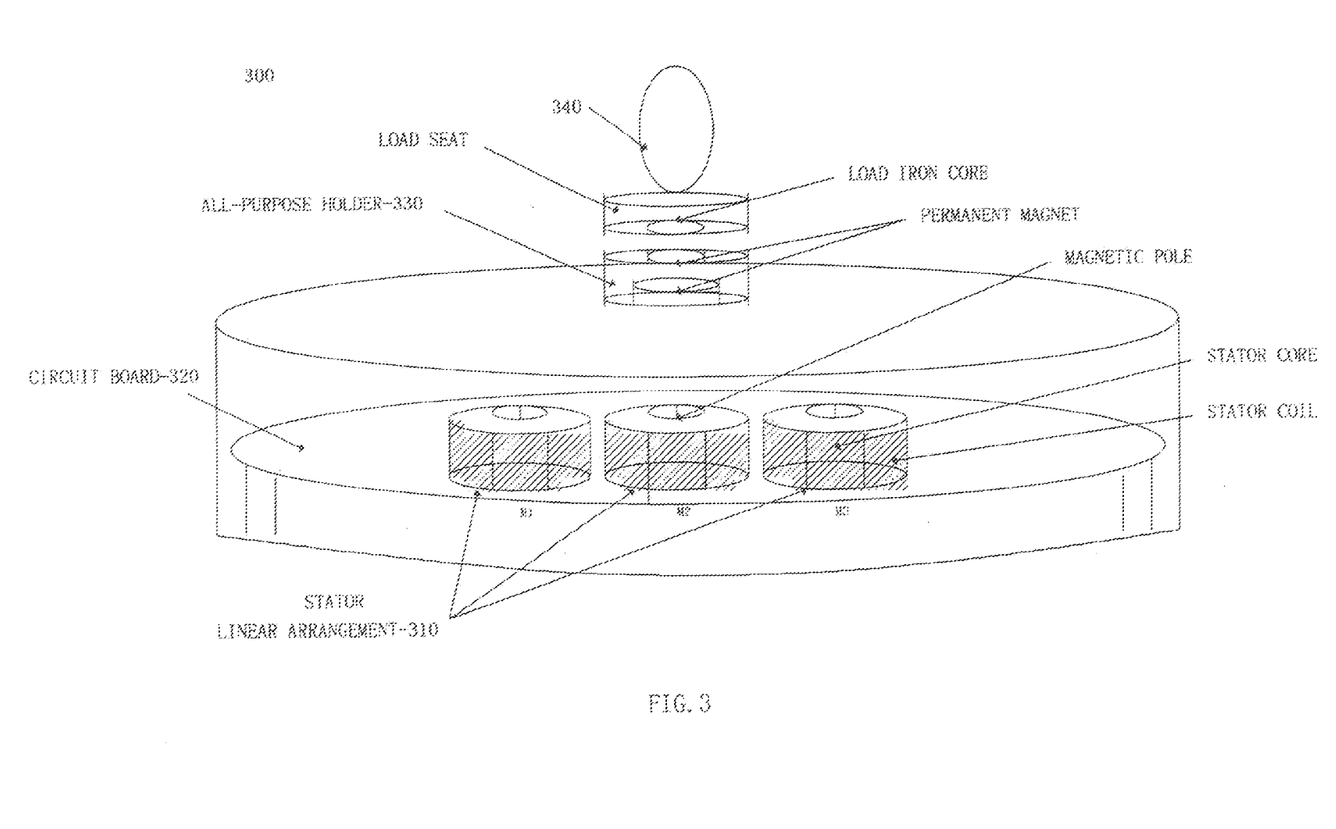
FIG. 3 depicts an overall structural diagram of another preferred embodiment of a support stand and holders assembly with one group of three electromagnetic stators in a linear arrangement.

FIG. 3 depicts an overall structural diagram of yet another preferred embodiment of the support stand and holders assembly with one group of three electromagnetic stators in a linear arrangement. It has a linear arrangement of three stators of electromagnets 310. Each stator 310 includes a stator core and stator coil, and is inserted into a circuit board 320. Instead of a candleholder, the same mechanism is used to support the stepping movements of an all-purpose holder 330. The bottom of the holder is a permanent magnet. The load on top of the holder could be a figurine or a small decorative item 340 like a plastic strawberry. There can be a separate load seat with a load iron core in the bottom. A figurine or a small decorative item could sit on top of the load seat or it could sit directly on the holder if the figurine or decorative item has an iron core or other similar material at the bottom so it can stick to the holder due to magnetic attraction force.

Figure 4:
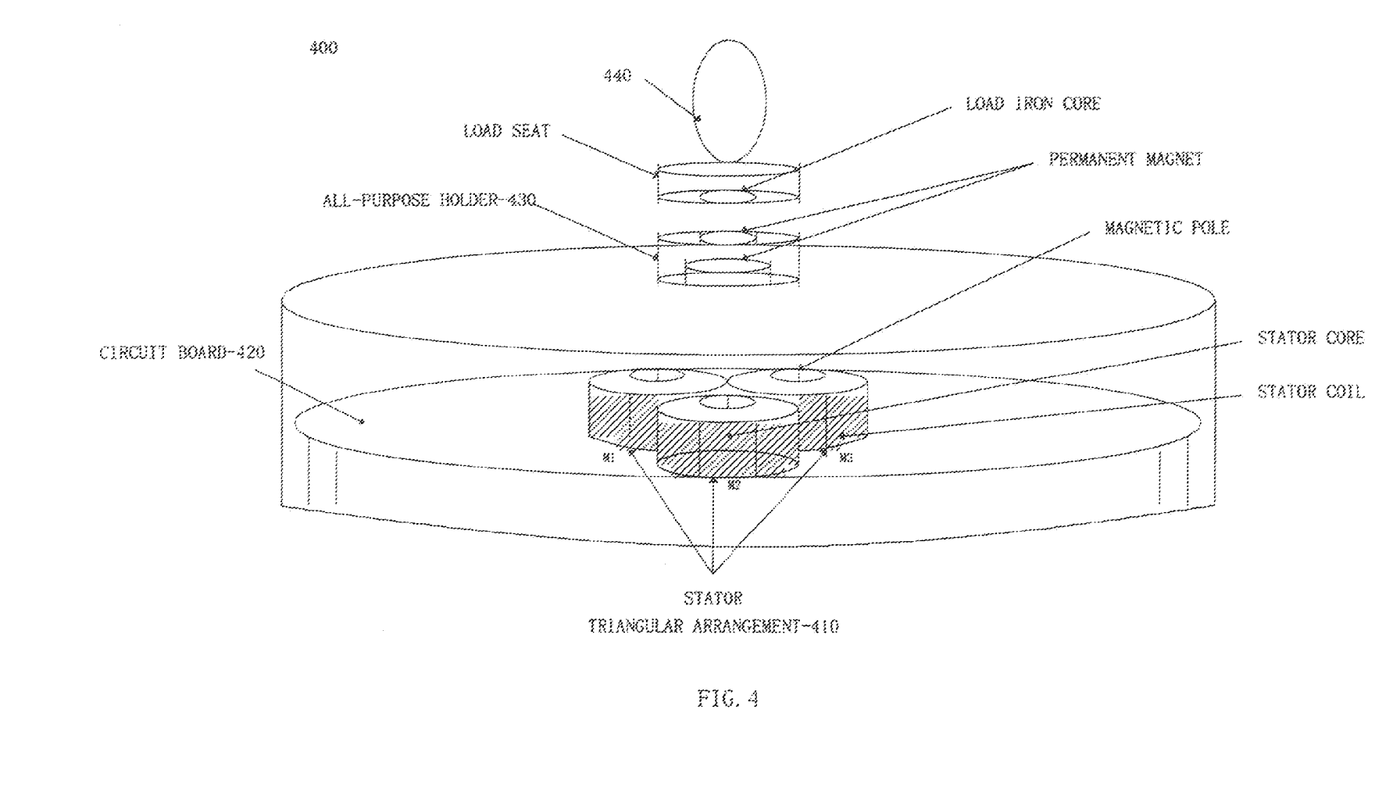
FIG. 4 depicts an overall structural diagram of another preferred embodiment of a support stand and holders assembly with one group of three electromagnetic stators in a triangular arrangement.

FIG. 4 depicts an overall structural diagram of yet another preferred embodiment of the support stand and holders assembly with one group of three electromagnetic stators in a triangular arrangement. Different from the example in FIG. 3, the example in FIG. 4 includes a triangular arrangement of three stators of electromagnets 410. Instead of repeated linear movements, the holder on top of the support stand can makes triangular movements in steps. Each stator 410 includes a stator core and stator coil, and is inserted into a circuit board 420. It also includes an all-purpose holder 430 and a load 440 on top of the holder.

Figure 5A:
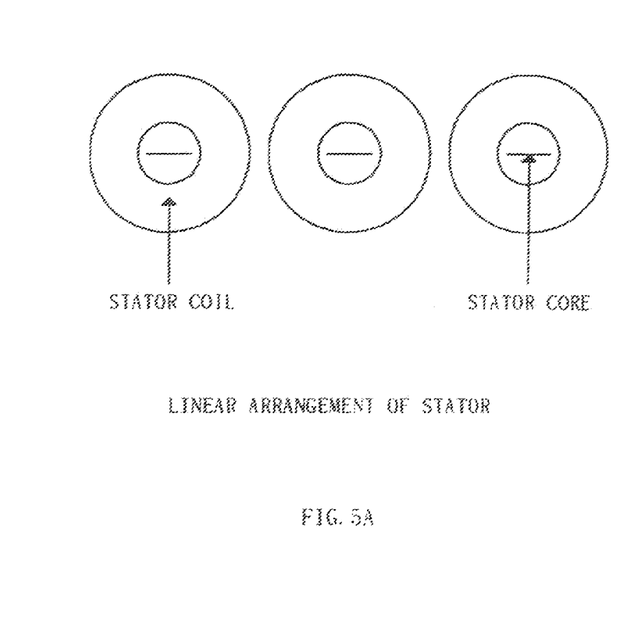
FIG. 5A depicts a structural illustration of a group of three electromagnetic stators in a linear arrangement.

FIG. 5A depicts a structural illustration of a group of three electromagnetic stators in a linear arrangement. Each of the stators includes a stator core in the center hole of a stator coil.

Figure 5B:
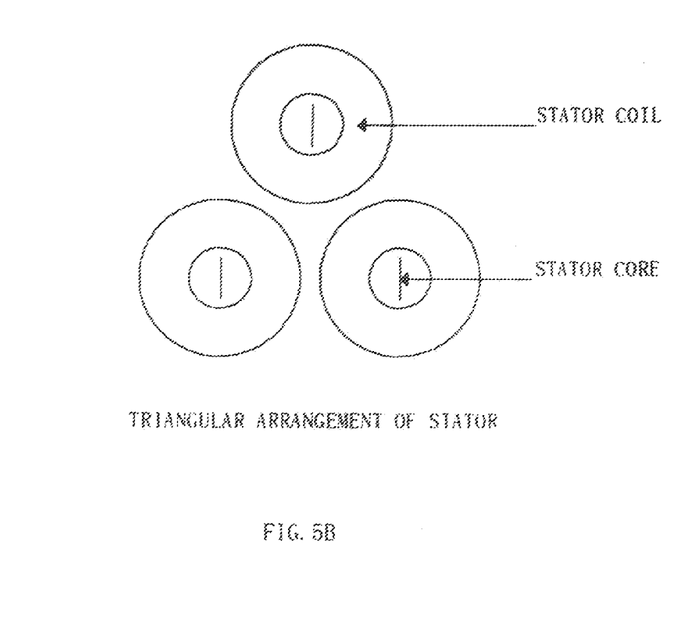
FIG. 5B depicts a structural illustration of a group of three electromagnetic stators in a triangular arrangement.

FIG. 5B depicts a structural illustration of a group of three electromagnetic stators in a triangular arrangement.

Figure 6:
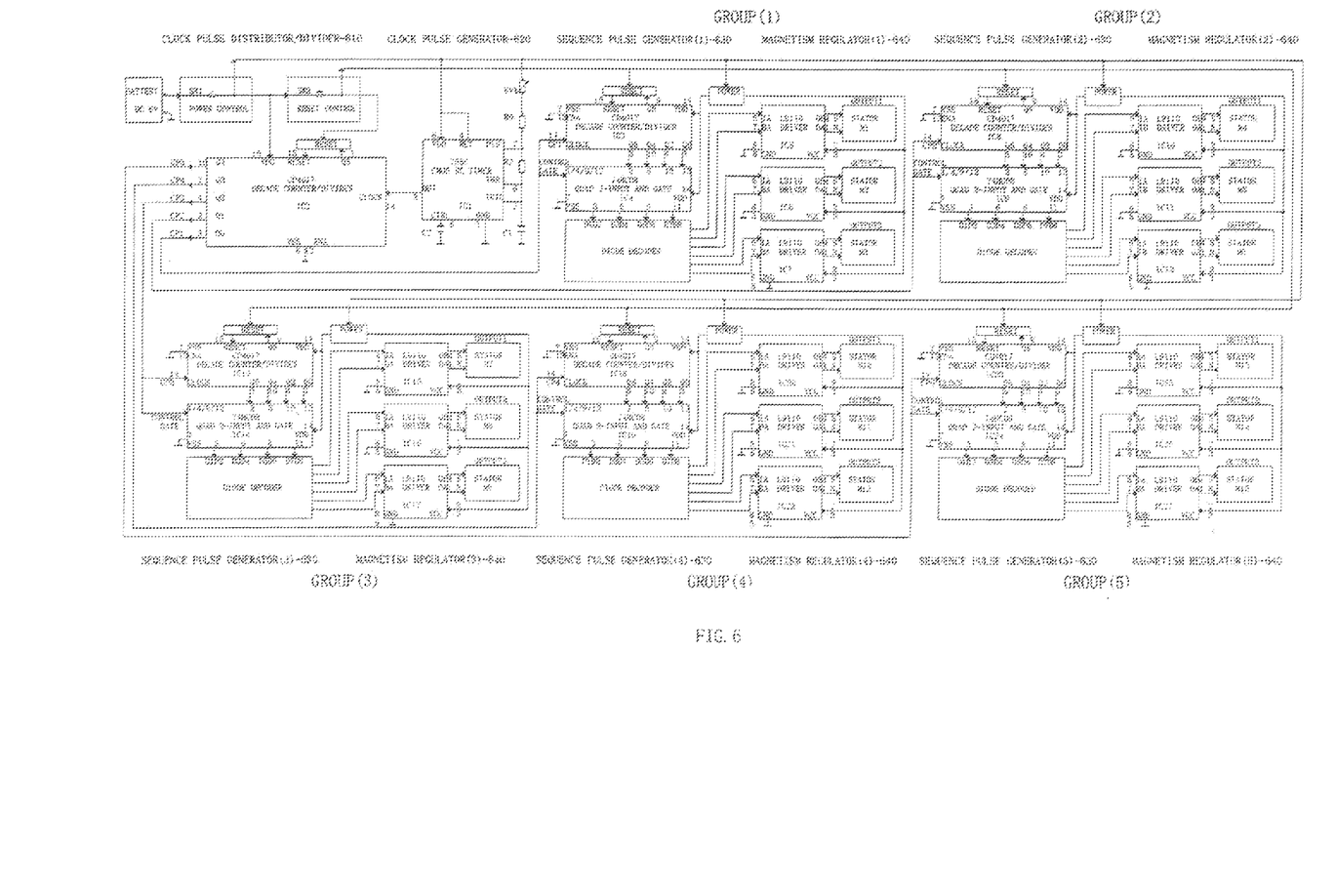
FIG. 6 depicts the overall circuit block diagram of all circuitry in a preferred embodiment.

FIG. 6 depicts the overall circuit block diagram of in a preferred embodiment. In this embodiment. There are 5 groups of stators and each group includes 3 stators. It includes a main control circuit board with a clock pulse generator 620 that sends timing pulses to a clock pulse distributor/divider 610. A clock pulse distributor/divider 610 is needed in this example because of the need to distribute the clock signals to five circuit boards that control the five groups of stators. A clock pulse distributor 610 is defined as the circuitry that distributes clock pulses to other circuit board or circuitries. It typically comprises of a Decade counter/Divider in this example. One choice of such a chip is the CD4017B decade counter/divider made by Fairchild Semiconductor.

A clock pulse generator 620 is defined as the circuitry that generates the periodic timing pulses. There are many different chip products capable of doing the job. In this example, the clock pulses generator is made of a CMOS RC Timer forming an oscillator. One choice of such a chip is the ICM7555 General Purpose CMOS Timer made by NXP Semiconductors. The timing signal is then sent to each circuit board that controls each group of the stators. There is a sequence pulse generator 810 on each circuit board that generates the sequence pulses through a decade counter/divider. A sequence pulse generator is defined as the circuitry that generates a sequence of pulses based on clock signals. The pulses are sent through quad gates to a diode decoder, then sent to a magnetism regulator 850 that includes three motor drivers that control the current directions of the electromagnetic stators. Changing of current direction in the stators lead to the switch of magnetic poles of the stators. A magnetism regulator is defined as circuitry that can switch current directions in one or more electromagnetic stators, thus regulating the magnetic poles of the stators. Alternatively, all the circuitry chips can reside in a single control circuit board with wires linked with each group of stators.

The circuit boards are powered by 4 AA batteries located in a compartment in the base of the table stand in a preferred embodiment. A Start/Stop push button switch is located on the top surface of the table stand and used to control the on/off of the circuit boards.

Optionally, one could add a reset control button to reset the counters in the system. The reset of a CD4017 decade counter/divider is by loading a high-level pulse to the reset pin 15. There are three ways of resetting counters in this embodiment.

a. Counter Pulse Reset:

This embodiment uses 6 CD4017 decade counter/dividers. For the CD4017 counter in the clock pulse distributor, the output pin Q5 is linked to reset pin 15 through the forward diode D1. When pin Q5 outputs a logic "1," the counter is reset. For the CD4017 counters in the 5 sequence pulse generators, their output Q8 is linked to the reset pin 15 through the forward diode D9. Similarly, when Q8 outputs a logic "1," the counter is reset.

b. Automatic Reset Upon Power-on:

The CD4017 counters are also automatically reset upon power-on. For the CD4017 counter in the clock pulse distributor, pin 15 is connected through a grounded 10K resistor and a reset capacitor to Vcc. When the power is switched on, the counter is automatically reset. For the CD4017 counters used in the 5 sequence pulse generators, their reset pin 15 is also connected through a grounded 10K resistor and a reset capacitor to Vcc. When the power is switched on, the counters are automatically reset.

c. Manual Reset:

The reset pin 15 of all the CD4017 counters are respectively connected to a grounded 10K resistor. A diode is connected to one side of the reset, and other side of the reset pin is connected to Vcc. When the power is on, one can manually press the reset, Vcc will the reset the counters through their respective reset pin 15.

Figure 7:
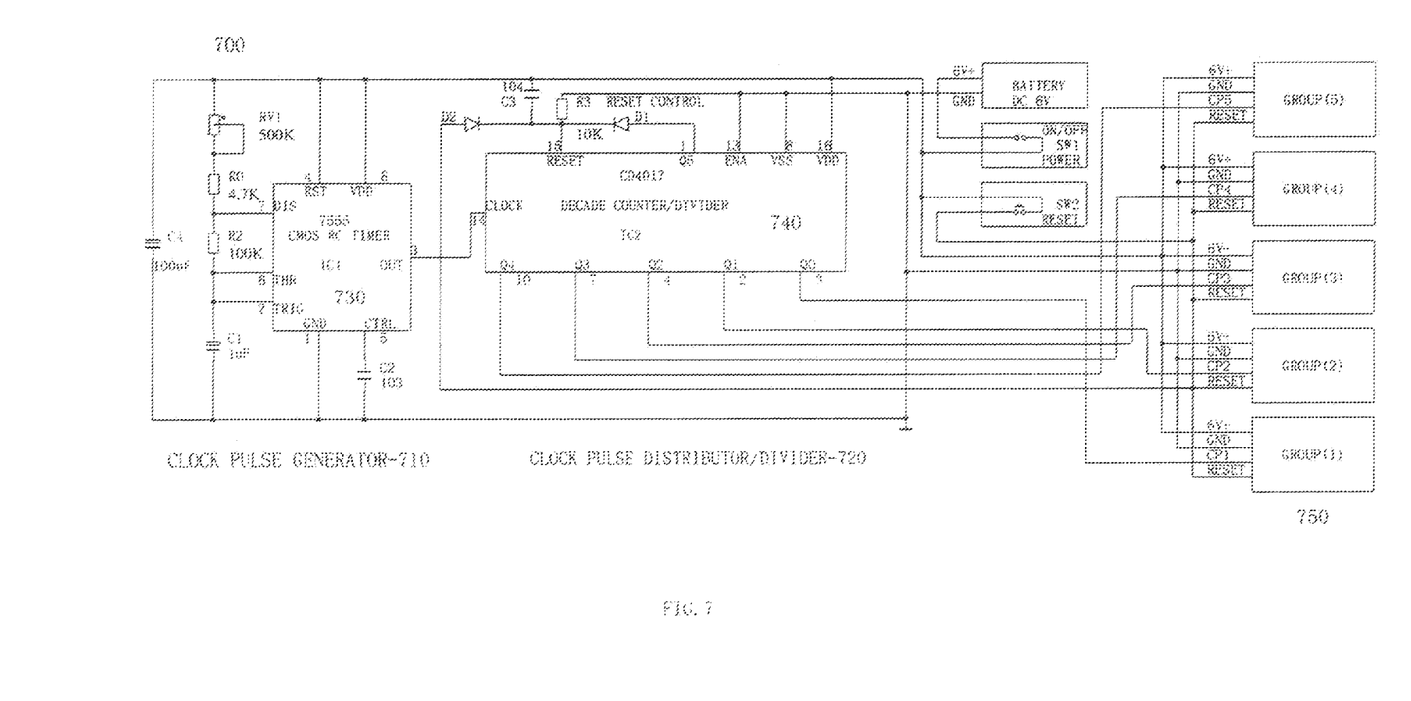
FIG. 7 depicts the circuit diagram of a clock pulse generator and a clock pulse distributor/divider of the circuitry in a preferred embodiment.

FIG. 7 depicts the circuit diagram of a clock pulse generator and a clock pulse distributor of the circuitry in a preferred embodiment. This example includes 5 groups of stators and each group includes 3 stators. It typically include a main circuit board with a clock pulse generator 710 and a clock pulse distributor/divider 720. The clock pulse signal divider 720 is typically made of a decade counter/driver like a CD4017 chip 740. The signals go through a gate control like a 74HC08 quad gates. They are then sent through an 8-pin diode decoder to the control drivers in five groups 750. One choice for a motor control driver is a L9110 chip, which controls the current direction of the three stators M1, M2 and M3. The changing of current direction then lead to the switch of magnetic poles of each stator. There is also a start/stop and a reset switch on the control circuit board.

Figure 8:
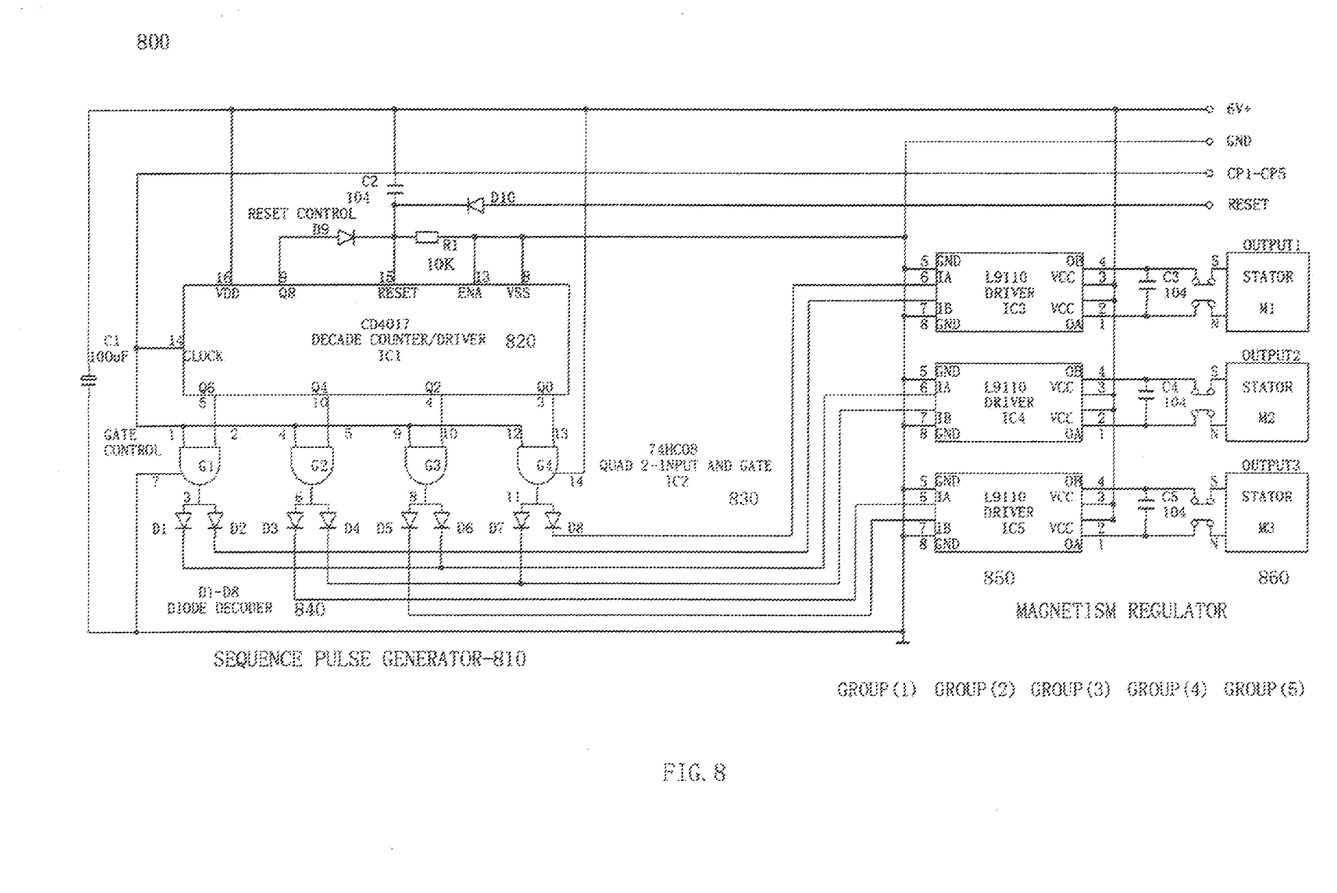
FIG. 8 depicts the circuit diagram of a sequence pulse generator and a magnetism regulator of the circuitry in a preferred embodiment.

FIG. 8 depicts the circuit diagram of a sequence pulse generator and a magnetism regulator in a preferred embodiment. This example also includes 5 groups of stators with 3 electromagnetic stators in each group. FIG. 8 provides more details of a sequence pulse generator 810 and a magnetism regulator with three motor drivers 850, and three stators 860. The sequence pulse generator 810 comprises of a decade counter/divider 820, a quad gates 830 and a diode decoder 840. A choice for the quad gates 830 is the 74HC08 made by Philips Semiconductors. There are also many choices for an 8-pin diode decoder as well. The pulse signals is distributed to three motor control drivers 850 that control the switching of magnetic poles of the electromagnetic stators 860.

Figure 9:
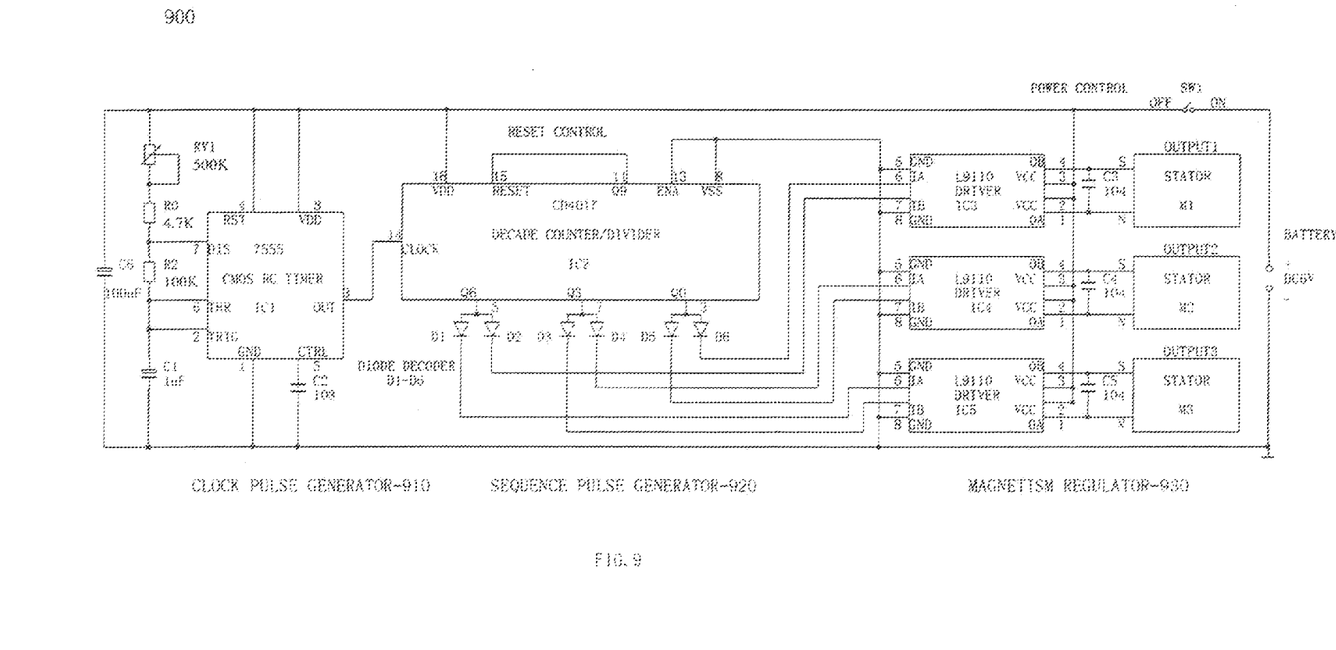
FIG. 9 depicts the overall circuit block diagram of all circuitry in another preferred embodiment.

FIG. 9 depicts the overall circuit diagram of yet another preferred embodiment. In this example, there are only 3 stators lined up triangularly in a single group. The single control circuit board includes a clock pulse generator 910 that generates clock signals. The clock pulse generator 910 is primarily comprised of a CMOS RC Timer forming an oscillator. There is no clock pulse distributor in this example with just one group of stators. The timing signal is sent to a sequence pulse generator 920 that generates the sequence of pulses through a decade counter/divider, the signals are distributed through a diode decoder to a magnetism regulator 930 that includes three motor drivers for controlling the current directions of the electromagnetic stators. Changing of current direction in the stators leads to the switch of magnetic poles of the stators.

Figure 10A:
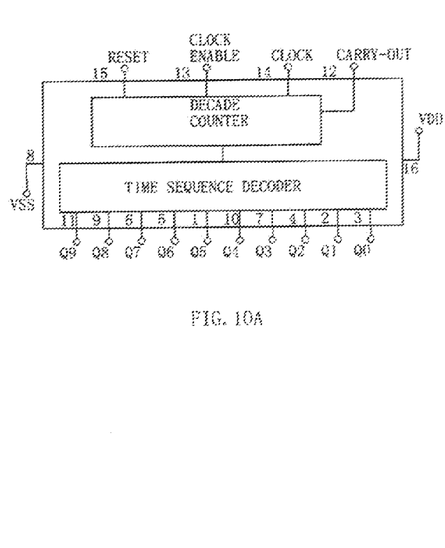
FIG. 10A depicts the circuit diagram of a CD4017 Decade Counter/Divider used in a preferred embodiment.

FIG. 10A depicts the circuit diagram of a CD4017 Decade Counter/Divider used in one preferred embodiment. The clock pulse distributor or sequence pulse generator in a preferred embodiment typically use a decade counter/divider in conjunction with a diode decoder, and optionally a quad gates. The CD4017 decade counter/divider is a typical choice. It consists of a decade counter and a time sequence decoder. There are two counter counting inputs CLOCK (pin 14) and CLOCK ENABLE (pin 13). If counting on the rising input pulses, signal is input from CLOCK (pin 14), and CLOCK ENABLE (pin 13) to set to logic "0." The results from the decade counter are decoded using the time sequence decoder. It counts the signal pulses based on their order. It then assigns the number of pulses to the 10 output pins Q0-Q9. When the total counts exceed 10, it resets to 0, and output a positive carry-out pulse from CARRY-OUT (pin 12).

The decade counter also includes a RESET. When exposed to a high voltage or positive pulse, the decade counter is reset to 0, and the time sequence decoder outputs "1" from Q0, and the reset output "0."

Figure 10B:
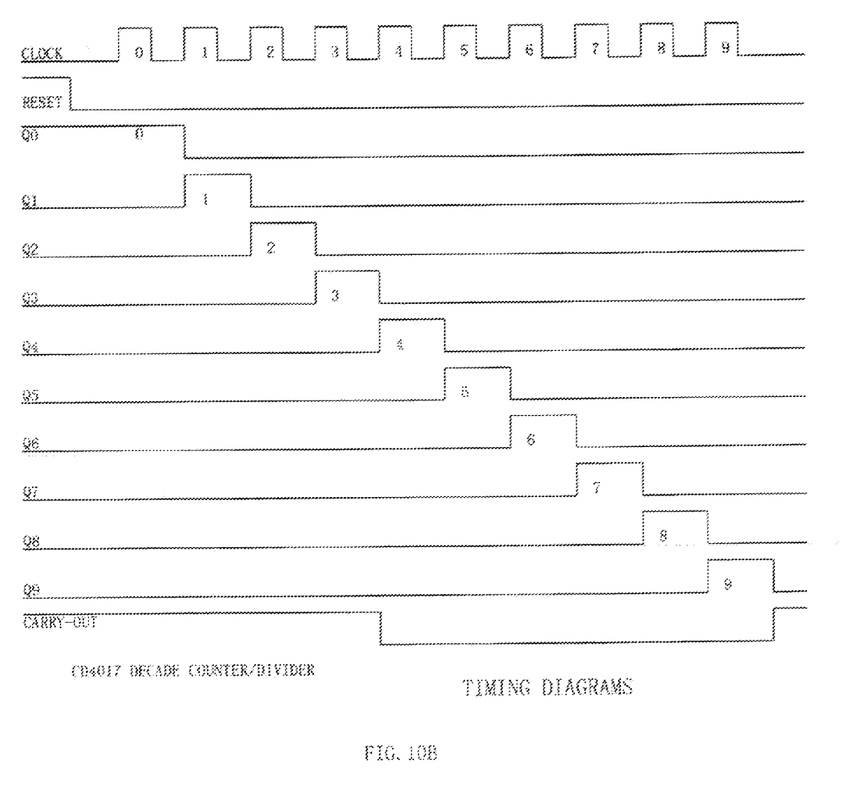
FIG. 10B depicts the timing diagram of a CD4017 Decade Counter/Divider used in a preferred embodiment.

FIG. 10B depicts the timing diagram of a CD4017 Decade Counter/Divider used in one preferred embodiment. When the RESET pin of the decade counter is exposed to a high voltage or positive pulse, the decade counter is reset to 0, and the time sequence decoder output "1" from Q0, and the reset output "0." When the clock input CLOCK ENABLE (pin 13) is grounded, CLOCK (pin 14) counts incrementally. The output of Q0 to Q9 matches the number of time sequence pulses. For example, if the count starts from 0, when the first time pulses is input. Q1 outputs logic "1." Q2 outputs logic "1" when the second time pulse comes, and so on. It returns to a "1" for Q0 when it counts the 10th time pulse.

Figure 11A:
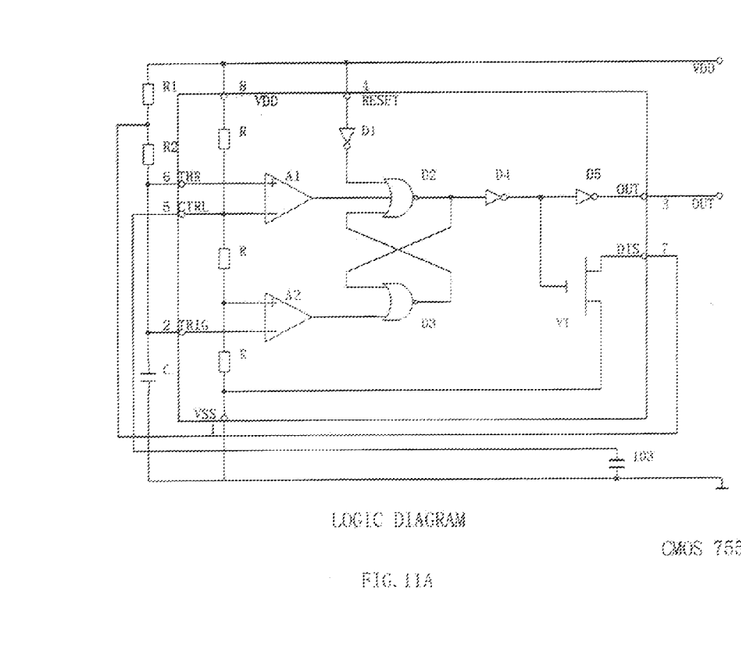
FIG. 11A depicts the logic diagram of a CMOS 7555 Timer used in a preferred embodiment.

FIG. 11A depicts the logic diagram of a 7555 CMOS Timer used in one preferred embodiment. A clock pulse generator used in one embodiment comprises of a 7555 CMOS Timer IC with external resistors and capacitor forming an RC oscillator. It provides the time pulses for the stepping motion of the holders.

Because the circuitry is designed to provide adjustable oscillation frequencies, one can regulate the resistor's resistance on the circuit board to change the RC oscillator frequency. The value of RC oscillation frequency directly regulates the speed of the holders' stepping motion.

FIG. 11A shows the basic components of a clock sequence generator using a 7555 CMOS Timer IC. A1 and A2 are comparators in the CMOS Timer. Using three resistors with the same R resistance, the reversed-phase input voltage is ⅔VDD, and in-phase input voltage for comparator A2 is ⅓VDD. Two NOR gates D2 and D3 constitutes a RS Flip-flop. VT is the discharge tube. Pin 4 is the reset pin, which is effective at low voltage. When acting as an oscillator, the input is a high voltage. R1, R2, and C are the external resistive and capacitive components used together with the 7555 CMOS Timer to form an oscillation circuitry.

Figure 11B:
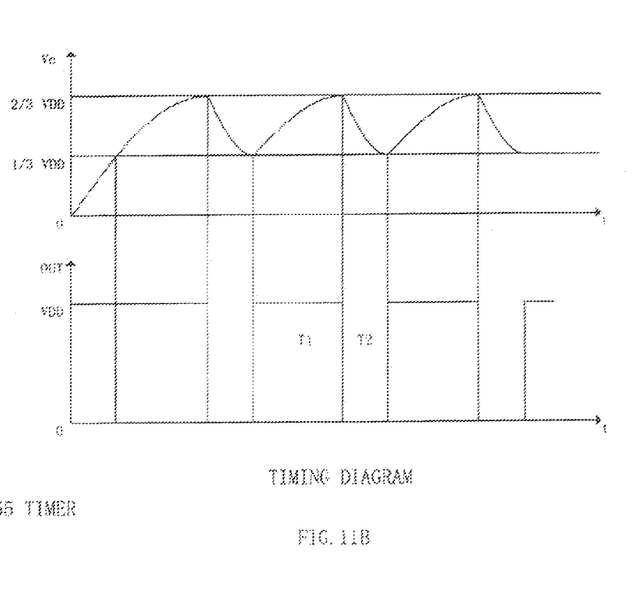
FIG. 11B depicts the timing diagram of a CMOS 7555 Timer used in a preferred embodiment.

FIG. 11B depicts the timing diagram of a CMOS 7555 Timer used in one preferred embodiment. At the time of initial power-on, the voltage is 0 at Capacitor C. The output from comparator A1 is "0" while A2 outputs "1." The RS trigger outputs "1." After two reverse-phase transformation through D4 and D5, The OUT outputs "1." Because the output from D4 is "0," the discharging tube VT closes.

Capacitor C is charged by power supply VDD through (R1+R2). When charged up to ⅔ VDD, A1 outputs "1." RS trigger outputs "0." After two reverse-phase transformation through D4 and D5, The OUT outputs "0." Because the output from D4 is "1," the discharging tube VT opens. Capacitor C discharges through VT and resistor R2. When the voltage at C goes down to ⅓VDD, A1 output "0" while A2 outputs "1." RS trigger outputs "1." OUT outputs "1" after D4 and D5 transformation. Because D4 outputs "0," discharging tube VT closes. Discharging ceases. Capacitor C is charged again through resistors (R1+R2). The same procedure is repeated to form a multi-resonant oscillator.

Oscillation frequency F0 can be calculated using the following equation:

$$F0=1.443/(R1+2R2)C$$

RV1 is a 500K adjustable resistor, and R0 is a 4.7K resistor.
R1=RV1+R0
R1=500K+4.7K=504.7K=504700 ohms (maximum resistance).
R1=0K+4.7K=4.7K=4700 ohms (minimum resistance)
R2=100K=100000 ohms
C=C1=1UF=1/1000000 F=0.000001 F
The lowest oscillating frequency is:

$$F0=1.443/(R1+2R2)C$$

$$F0=1.443/(504700+200000)\times 0.000001$$

$$=1.443/0.7047$$

$$=2\ HZ$$

The maximum oscillation frequency is:

$$F0=1.443/(R1+2R2)C$$

$$F0=1.443/(4700+200000)\times 0.000001$$

$$=1.443/0.2047$$

$$=7\ HZ$$

The frequency F0 is adjustable between 2 HZ-7 HZ in this preferred embodiment.

Although exemplary embodiments of the assembly of the present invention have been illustrated in the accompanied drawings and described in the foregoing detailed description, it will be understood that the invention is not limited to the embodiments disclosed, but is capable of numerous rearrangements, modifications, and substitutions without departing from the spirit of the invention as set forth and defined by the following claims. Further, although depicted in a particular manner, various modules or blocks may be repositioned without departing from the scope of the current invention.

What is claimed is:

1. A cake stand assembly comprising:
a portable table stand suitable for placing a cake on its top surface;
one or more candleholders with a permanent magnet located at the bottom of each holder;
a plurality of electromagnets inside said table stand wherein said electromagnets are divided into N group(s) with a preset number of electromagnets in each group, and each group of electromagnets are fixed to preset locations of said table stand;
one or more integrated circuit boards inside said table stand with circuitry configured for regulating the switch of magnetic poles of said electromagnets and causing stepping movement of said plurality of candleholders by the magnetic forces between the electromagnets and candleholders; and
a button switch to start or stop movements of said candleholders.

2. The cake stand of claim 1 further comprises a button switch capable of resetting the locations of said candleholders to their preset locations.

3. The cake stand of claim 1 wherein said portable table stand is made of non-magnetic material and further comprises an outer shell and a base support.

4. The cake stand of claim 1 wherein said each of said electromagnets is an electromagnetic stator comprised of a stator core and a stator coil.

5. The cake stand of claim 4 wherein said group number N is 5 and each group is comprised of 3 stators and there is one integrated circuit board for each group of stators.

6. The cake stand of claim 5 wherein said stators in each group are aligned linearly on top of each integrated circuit board.

7. The cake stand of claim 5 wherein said stators in each group are aligned triangularly on top of each integrated circuit board.

8. The cake stand of claim 1 wherein said integrated circuit board comprises of a clock pulse generator, a sequence pulse generator, and a magnetism regulator.

9. The cake stand of claim 1 wherein said integrated circuit board comprises of a clock pulse distributor.

10. The cake stand of claim 9 wherein said integrated circuit board is capable of creating stepping movements of said candleholders by regulating periodic switch of the magnetic poles of each electromagnets.

11. A support stand comprising:
a portable table stand;
one or more holders with a permanent magnet located at the bottom of each holder;
a plurality of electromagnets inside said table stand wherein said electromagnets are fixed to preset locations of said table stand;
one integrated circuit board inside said table stand configured for controlling the switch of magnetic poles of said electromagnets and causing stepping movement of said plurality of candleholders; and
a button switch on the surface of said table to start or stop movements of said holders.

12. The support stand of claim 11 further comprises a button switch capable of resetting the locations of said holders to their preset locations.

13. The support stand of claim 11 wherein said portable table stand is made of non-magnetic material and further comprises an outer shell and a base support.

14. The support stand of claim 11 wherein said each of said electromagnets is an electromagnetic stator comprised of a stator core and a stator coil.

15. The support stand of claim 14 wherein said stators are aligned triangularly on top of said integrated circuit board.

16. The support stand of claim 14 wherein said stators are aligned linearly on top of said integrated circuit board.

17. The support stand of claim 11 wherein said integrated circuit board comprises of a clock pulse generator, a sequence pulse generator, and a magnetism regulator.

18. The support stand of claim 17 wherein said integrated circuit board is capable of creating stepping movements of said holders by regulating periodic switch of the magnetic poles of each electromagnets.

19. The support stand of claim 11 where said holders is capable of holding a scented candle, a figurine, or a decorative item.

\* \* \* \* \*